(12) United States Patent
Specht et al.

(10) Patent No.: US 9,083,063 B2
(45) Date of Patent: Jul. 14, 2015

(54) ELECTROCHEMICAL CELL INCLUDING AN INTEGRATED CIRCUIT

(71) Applicant: The Gillette Company, Boston, MA (US)

(72) Inventors: Steven Jeffrey Specht, Brookfield, CT (US); Jordan Todorov Bourilkov, Bethany, CT (US); William Fitler Morris, Newtown, CT (US); Faiz Feisal Sherman, Mason, OH (US)

(73) Assignee: The Gillette Company, Boston, MA (US)

( * ) Notice: Subject to any disclaimer, the term of this patent is extended or adjusted under 35 U.S.C. 154(b) by 226 days.

(21) Appl. No.: 13/855,828

(22) Filed: Apr. 3, 2013

(65) Prior Publication Data

US 2014/0302351 A1 Oct. 9, 2014

(51) Int. Cl.
| | | |
|---|---|---|
| *H01M 14/00* | (2006.01) | |
| *H01M 10/42* | (2006.01) | |
| *H01M 2/02* | (2006.01) | |
| *G01R 31/36* | (2006.01) | |

(52) U.S. Cl.
CPC ....... *H01M 10/4257* (2013.01); *G01R 31/3655* (2013.01); *H01M 2/022* (2013.01); *H01M 2/0217* (2013.01); *H01M 10/425* (2013.01); *H01M 2010/4278* (2013.01)

(58) Field of Classification Search
CPC .......... H01M 10/425; H01M 10/4257; H01M 2/022; H01M 2/0217; H01M 2010/4278
USPC ............................................................ 429/7
See application file for complete search history.

(56) References Cited

U.S. PATENT DOCUMENTS

| | | |
|---|---|---|
| 6,483,275 B1 | 11/2002 | Nebrigic et al. |
| 6,617,069 B1 | 9/2003 | Hopper et al. |
| 7,386,404 B2 | 6/2008 | Cargonja et al. |
| 7,474,230 B2 | 1/2009 | Blom et al. |
| 7,511,454 B1 | 3/2009 | Legg |
| 7,768,236 B2 | 8/2010 | Takamura et al. |
| 7,911,182 B2 | 3/2011 | Cargonja et al. |
| 2002/0001745 A1 | 1/2002 | Gartstein et al. |
| 2006/0261960 A1 | 11/2006 | Haraguchi et al. |
| 2008/0079391 A1 | 4/2008 | Schroeck et al. |
| 2008/0157924 A1 | 7/2008 | Batra |
| 2008/0206627 A1 | 8/2008 | Wright |
| 2009/0273473 A1 | 11/2009 | Tuttle |
| 2010/0081049 A1 | 4/2010 | Holl et al. |

(Continued)

FOREIGN PATENT DOCUMENTS

WO WO 2011063679 A1 * 6/2011

OTHER PUBLICATIONS

WO 2012/070635 A1, TERAMOTO, Shigeki et al., May 31, 2012.*

(Continued)

*Primary Examiner* — Jonathan Jelsma
(74) *Attorney, Agent, or Firm* — Leo J. White; Kevin C. Johnson; Steven W. Miller

(57) ABSTRACT

An electrochemical cell has a housing. The housing has at least one open end and a sidewall. An anode; a cathode; a separator disposed between the anode and the cathode; and an electrolyte are included within the housing. A magnetic diverter is affixed to an external surface of the sidewall of the housing. The magnetic diverter includes a recess. An integrated circuit is positioned within the recess.

10 Claims, 3 Drawing Sheets

(56) References Cited

U.S. PATENT DOCUMENTS

| | | |
|---|---|---|
| 2010/0143753 A1* | 6/2010 | Kim et al. .................. 429/7 |
| 2010/0209744 A1 | 8/2010 | Kim |
| 2011/0293969 A1 | 12/2011 | Hoofman et al. |
| 2013/0161380 A1 | 6/2013 | Joyce et al. |
| 2013/0295421 A1 | 11/2013 | Teramoto et al. |

OTHER PUBLICATIONS

PCT International Search Report with Written Opinion in corresponding international application PCT/US2014/031858 dated Jul. 2, 2014.

* cited by examiner

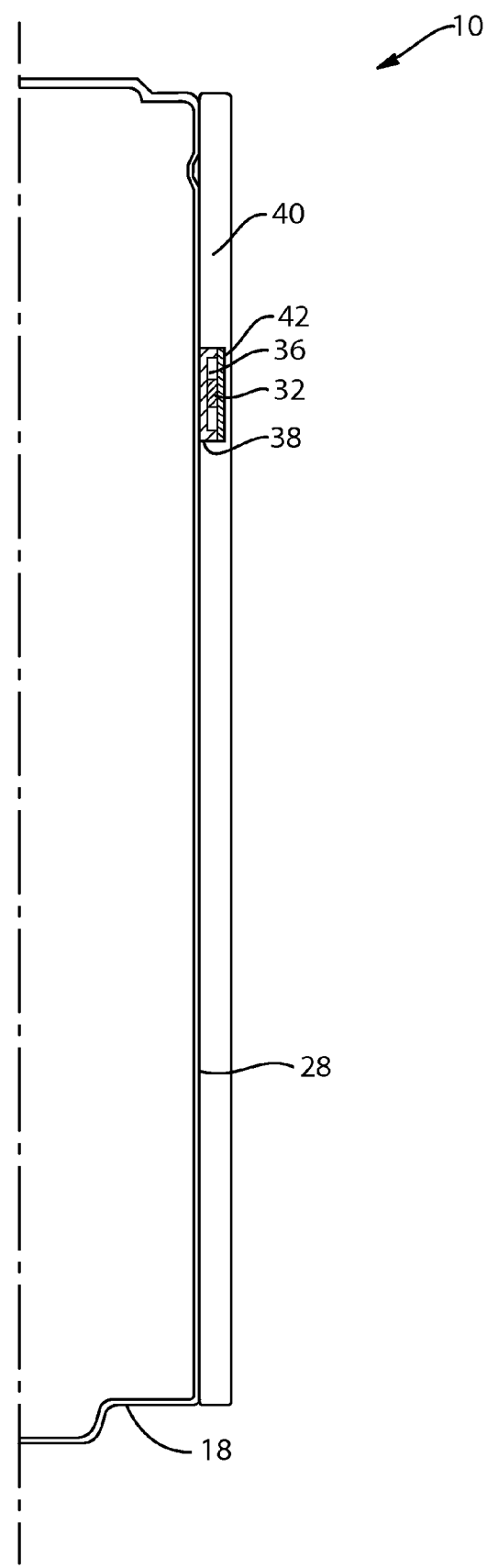

ns and examples provided herein are directed towards primary batteries, and more specifically directed towards alkaline primary batteries, it should be appreciated that the invention applies to both primary and secondary batteries and that both primary and secondary batteries, regardless of their embodiments, are within the scope of this application.

ELECTROCHEMICAL CELL INCLUDING AN INTEGRATED CIRCUIT

FIELD OF THE INVENTION

The invention relates to electrochemical cells including an integrated circuit.

BACKGROUND OF THE INVENTION

Electrochemical cells, or batteries, are commonly used as electrical energy sources. A battery contains a negative electrode, typically called the anode, and a positive electrode, typically called the cathode. The anode contains an active material that can be oxidized. The cathode contains an active material that can be reduced. The anode active material is capable of reducing the cathode active material. A separator is disposed between the anode and cathode. An electrolyte is also included within the battery. The aforementioned components are generally disposed in a metal can.

When a battery is used as an electrical energy source in a device, electrical contact is made to the anode and the cathode of the battery, allowing electrons to flow through the device and permitting the respective oxidation and reduction reactions to occur in order to provide electrical power to the device. The electrolyte in contact with the anode and the cathode contains ions that flow through the separator between the electrodes to maintain charge balance throughout the battery during discharge.

Battery testers may be used to determine characteristics of a battery, such as the remaining battery capacity. An exemplary type of a common battery tester that is placed on batteries is known as a thermochromic-type tester. In a thermochromic battery tester, there can be a circuit that is completed by a consumer manually depressing one or two button switches. Once the switch is depressed, the consumer has connected the battery to the thermochromic tester. The thermochromic tester may include a silver resistor, e.g., a flat silver layer that has a variable width so that the electrical resistance also varies along its length. As current travels through the silver resistor, the dissipated power generates heat that changes the color of a thermochromic ink display that is over the silver resistor. The thermochromic ink display is arranged as a gauge to indicate the relative capacity of the battery. However, it is typically necessary to manually hold the battery and/or remove the battery from the device in order to test the battery using thermochromic battery testers. Other battery tester systems are desired that do not require manual interaction between the consumer and the battery. In addition, battery tester systems including advanced processing and communication capabilities without increasing the overall dimensions of a battery are desired.

SUMMARY OF THE INVENTION

The invention is also directed towards electrochemical cell comprising: a housing having at least one open end and a sidewall. The housing includes an anode, a cathode, a separator disposed between the anode and the cathode, and an electrolyte. A magnetic diverter including a recess is affixed to an external surface of the sidewall of the housing. An integrated circuit is positioned within the recess.

BRIEF DESCRIPTION OF THE DRAWINGS

While the specification concludes with claims particularly pointing out and distinctly claiming the subject matter, which is regarded as forming the present invention, it is believed that the invention will be better understood from the following description taken in conjunction with the accompanying drawings.

FIG. 3 is a cross-section of an electrochemical cell including an integrated circuit of the present invention.

DETAILED DESCRIPTION OF THE INVENTION

Electrochemical cells, or batteries, may be primary or secondary. Primary batteries are meant to be discharged, e.g., to exhaustion, only once and then discarded. Primary batteries are described, for example, in David Linden, Handbook of Batteries (McGraw-Hill, 4$^{th}$ ed. 2011). Secondary batteries are intended to be recharged. Secondary batteries may be discharged and then recharged many times, e.g., more than fifty times, more than a hundred times, or more than a thousand times. Secondary batteries are described, e.g., in David Linden, Handbook of Batteries (McGraw-Hill, 4$^{th}$ ed. 2011). Batteries may contain aqueous or non-aqueous electrolytes. Accordingly, batteries may include various electrochemical couples and electrolyte combinations. Although the description and examples provided herein are directed towards primary batteries, and more specifically directed towards alkaline primary batteries, it should be appreciated that the invention applies to both primary and secondary batteries and that both primary and secondary batteries, regardless of their embodiments, are within the scope of this application.

Figure 1:
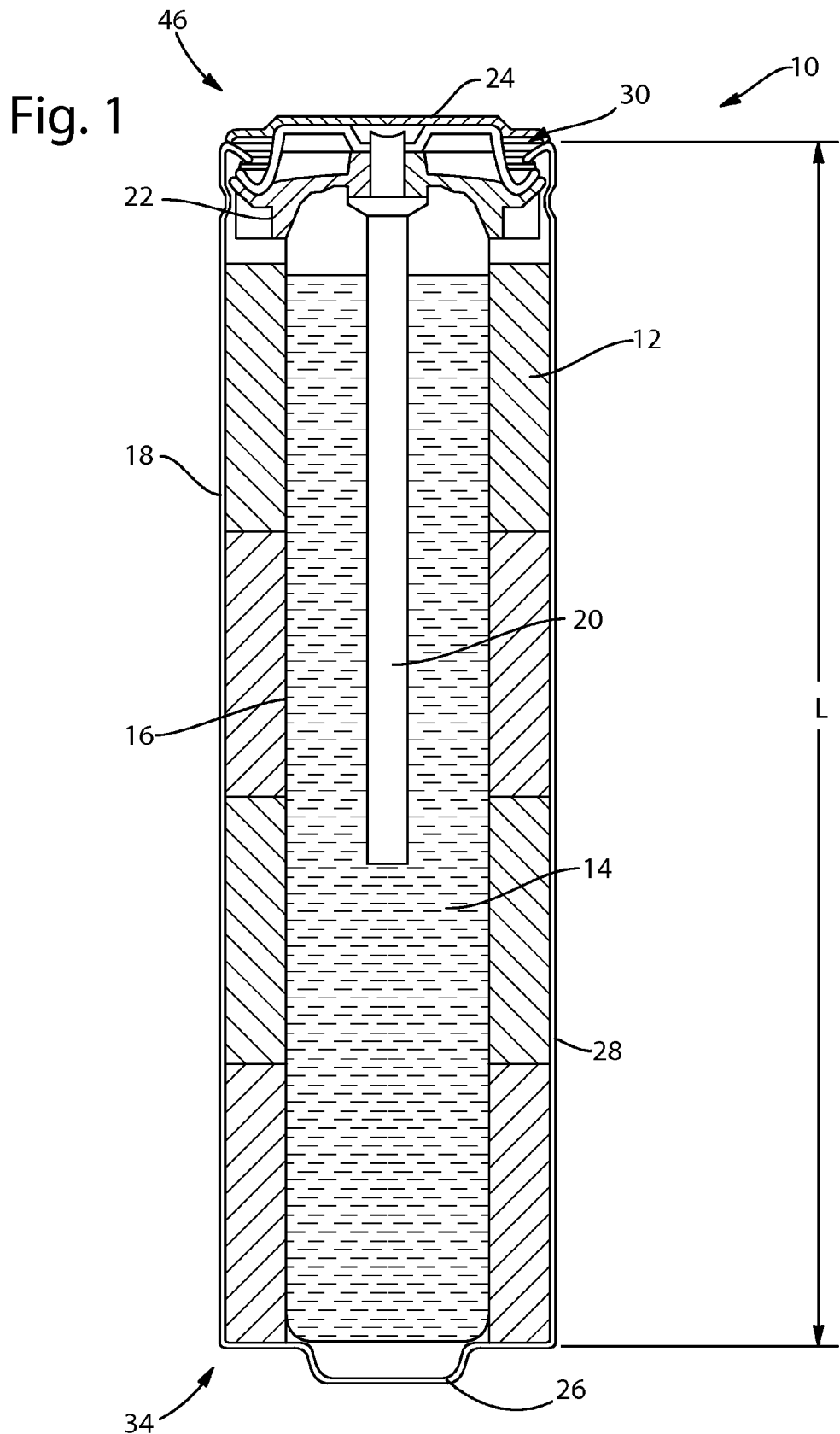
FIG. 1 is a cross-section of a cylindrical electrochemical cell.

Referring to FIG. 1, an exemplary cylindrical electrochemical cell, or battery, 10 includes a cathode 12, an anode 14, a separator 16 and a housing 18. Battery 10 also includes current collector 20; seal, also referred to as an insulator or grommet, 22; and an end cap 24. The end cap 24, current collector 20, and seal 22 form the end cap assembly 30. The end cap assembly 30 may serve as the negative terminal for the battery 10. A pip 26 is located at the end of the battery 10 that is opposite the end cap assembly 30. The pip 26 may serve as the positive terminal of the battery 10 when end cap assembly 30 functions as the negative terminal of the battery 10. An electrolytic solution (not shown) is dispersed throughout the battery 10.

Figure 2:
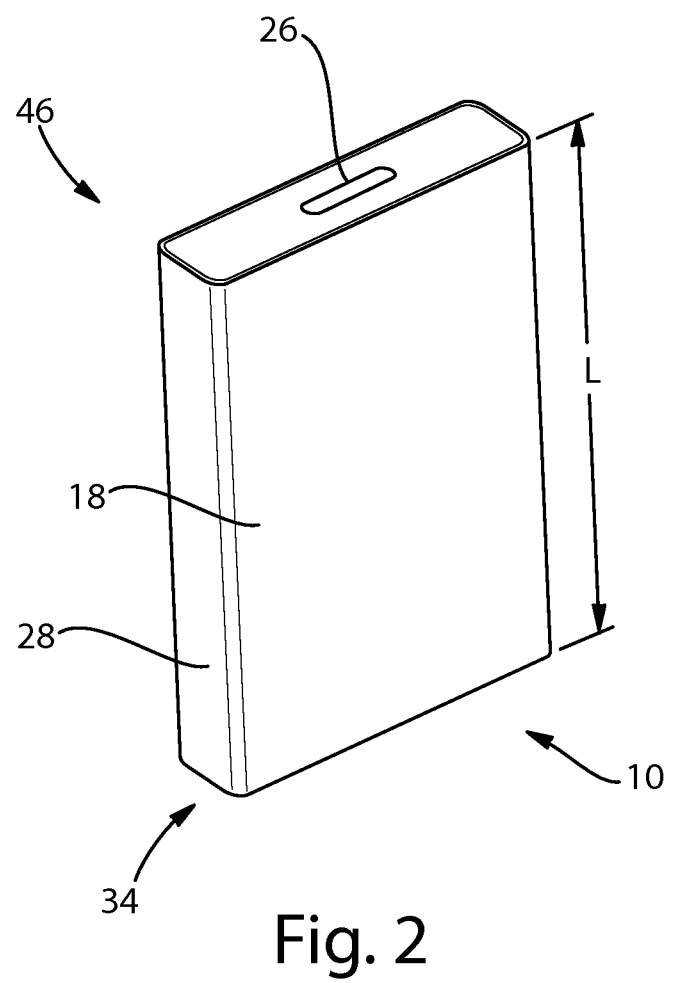
FIG. 2 is a perspective view of a prismatic electrochemical cell.

Referring to FIG. 2, an exemplary prismatic electrochemical cell, or battery, 10 includes a cathode, an anode, and a separator (all not shown) within a housing 18. The housing 18 may have a prismatic shape, for example, a shape comprising at least two parallel plates, such as a shape that is rectangular or square. Battery 10 also includes a current collector; a seal, also referred to as an insulator or grommet; and an end cap (all not shown). A pip 26 is located at an end of the battery 10. An electrolytic solution (not shown) is dispersed throughout the battery 10.

Referring to FIGS. 1 and 2, the housing 18 can be of any conventional type commonly used for batteries and can be made of any suitable material, such as, e.g., nickel-plated cold-rolled steel or plastic. The material may have an overall thickness of less than about 1.0 mm, preferably from about 0.10 mm to about 0.25 mm The housing 18 may be formed via a stamping process, such as deep-drawing. The drawn housing 18 can include at least one open end 46. The housing may have a closed end 34 that is integrally formed when the housing 18 is drawn. The closed end 34 may opposite the open end 46 of the housing 18. The housing 18 may include a sidewall 28 that runs from the open end 46 to the closed end 34 of the housing. The sidewall 28 may have a length L. The housing 18 may have a conventional cylindrical shape—or may have any other suitable non-cylindrical, e.g., prismatic, shape. Interior walls of the housing 18 may be treated with a material that has low electrical-contact resistance to an electrode. The interior walls of the housing 18 may be plated, e.g., with nickel, gold, or other metal or painted with a carbon-loaded paint.

Batteries come in varying sizes and dimensions. The International Electrotechnical Commission (IEC), for example, has established standard sizes and dimensions for batteries available to consumers at retail. The IEC has set standard sizes and dimensions, for example, cylindrical batteries, similar to the exemplary battery of FIG. 1, such as AAA batteries, AA batteries, C batteries, and D batteries. A AA battery can have a maximum length of about 50.5 mm with a minimum distance from the pip end to the negative contact of about 49.2 mm and a diameter ranging from about 13.5 mm to about 14.5 mm A AAA battery can have a maximum length of about 44.5 mm with a minimum distance from the pip end to the negative contact of about 43.3 mm and a diameter ranging from about 9.5 mm to about 10.5 mm. Similarly, standard sizes and dimensions have been set for non-cylindrical batteries. A 9V alkaline battery, for example, has a prismatic, or rectangular, shape with a maximum height of about 48.5 mm; a maximum length of about 26.5 mm; and a maximum width of about 17.5 mm. Individual battery or device manufacturers may designate the dimensions for prismatic batteries, similar to the exemplary battery of FIG. 2, that may not be generally available at retail, such as lithium ion prismatic batteries. Prismatic batteries of this type may have height of less than about 5 mm; a length of less than about 42 mm; and a width of less than about 34 mm. It should be appreciated that the present invention applies to batteries of various sizes, such as cylindrical and prismatic, and dimensions, such as AA, AAA, C, D, 9V, and those designated by individual battery or device manufacturers, where the electrochemical cell includes an integrated circuit without exceeding, or falling below, standard battery dimensions, such as those set by the IEC.

An end cap assembly 30 can include the current collector 20, the seal 22, and the end cap 24. The current collector 20 may be made of metal, e.g., zinc, copper, brass, bronze, or any other suitable material. The current collector 20 may be optionally plated with tin, zinc, bismuth, indium, or another suitable material presenting a low electrical-contact resistance between the current collector 20 and, for example, the anode 14. The seal 22 may be made of, for example, a polyamide resin, such as Nylon. The end cap 24 may be made of metal, e.g., steel, stainless steel, brass, or any other suitable material. The end cap 24 may be optionally plated with nickel, gold, brass, or another suitable material presenting a low electrical-contact resistance between the end cap 24 and, for example, the electrical contacts within a device (not shown).

The end cap assembly 30 may be placed on the at least one open end 46 of the housing 18. A portion of the sidewall 28 of the housing 19 may extend past end cap assembly 30 when the end cap assembly is seated within the at least one open end 46 of the housing 18. The portion of the sidewall of the housing 18 extending past the seated end cap assembly can be crimped over the end cap assembly 30 to seal the housing 18 of the battery 10 closed.

Cathode 12 includes one or more electrochemically active cathode materials. The electrochemically active cathode material may include manganese oxide, manganese dioxide, electrolytic manganese dioxide (EMD), chemical manganese dioxide (CMD), high power electrolytic manganese dioxide (HP EMD), lambda manganese dioxide, and mixtures thereof. Other electrochemically active cathode materials include, but are not limited to, silver oxide; nickel oxide; nickel oxyhydroxide; copper oxide; copper salts, such as copper iodate; bismuth oxide; high-valence nickel; oxygen; alloys thereof, and mixtures thereof. The nickel oxide can include nickel oxyhydroxide, cobalt oxyhydroxide-coated nickel oxyhydroxide, delithiated layered lithium nickel oxide, and combinations thereof. The nickel oxyhydroxide can include beta-nickel oxyhydroxide, gamma-nickel oxyhydroxide, and/or intergrowths of beta-nickel oxyhydroxide and/or gamma-nickel oxyhydroxide. The cobalt oxyhydroxide-coated nickel oxyhydroxide can include cobalt oxyhydroxide-coated beta-nickel oxyhydroxide, cobalt oxyhydroxide-coated gamma-nickel oxyhydroxide, and/or cobalt oxyhydroxide-coated intergrowths of beta-nickel oxyhydroxide and gamma-nickel oxyhydroxide. The nickel oxide can include a partially delithiated layered nickel oxide having the general chemical formula $Li_{1-x}H_yNiO_2$, wherein $0.1 \leq x \leq 0.9$ and $0.1 \leq y \leq 0.9$. The high-valence nickel may, for example, include tetravalent nickel.

The cathode 12 may also include carbon particles and a binder. The carbon particles are included in the cathode to allow the electrons to flow through the cathode. The carbon particles may be graphite, such as expanded graphite and natural graphite. Examples of binders that may be used in the cathode include polyethylene, polyacrylic acid, or a fluorocarbon resin, such as PVDF or PTFE. An example of a polyethylene binder is sold under the trade name COATHYLENE HA-1681 (available from Hoechst or DuPont). The cathode 12 may also include other additives. The cathode may be, for example, provided in the form of pressed pellets.

Anode 14 can be formed of at least one electrochemically active anode material, a gelling agent, and minor amounts of additives, such as gassing inhibitor. The electrochemically active anode material may include zinc; cadmium; iron; metal hydride, such as $AB_5$, $AB_2$, and $A_2B_7$; alloys thereof; and mixtures thereof. Examples of a gelling agent that may include a polyacrylic acid; a grafted starch material; a salt of a polyacrylic acid; a carboxymethylcellulose; a salt of a carboxymethylcellulose (e.g., sodium carboxymethylcellulose); or combinations thereof. The anode may include a gassing inhibitor that may include an inorganic material, such as bismuth, tin, or indium. Alternatively, the gassing inhibitor can include an organic compound, such as a phosphate ester, an ionic surfactant, or a nonionic surfactant.

An electrolyte may be dispersed throughout the cathode 12, the anode 14 and the separator 16. The electrolyte comprises an ionically conductive component in an aqueous solution. The ionically conductive component may be a hydroxide. The hydroxide may be, for example, sodium hydroxide, potassium hydroxide, lithium hydroxide, cesium hydroxide, and mixtures thereof. The ionically conductive component may also include a salt. The salt may be, for example, zinc chloride, ammonium chloride, magnesium perchlorate, magnesium bromide, and mixtures thereof. The concentration of the ionically conductive component may be selected depending on the battery design and its desired performance. An exemplary aqueous alkaline electrolyte may include a hydroxide as the ionically conductive component, such as potassium hydroxide, in a solution with water. The aqueous alkaline electrolyte may also include zinc oxide (ZnO).

Separator 16 may comprise woven or nonwoven paper or fabric. Separator 16 may include a layer of, for example, cellophane combined with a layer of non-woven material. The separator also can include an additional layer of non-woven material. The separator material may be thin. The separator, for example, may have a dry thickness of less than 150 micrometers (microns). The separator has a basis weight of 40 g/m² or less. Separator 16 may have an air permeability value, as defined in ISO 2965, from about 2000 cm³/cm²·min @ 1 kPa to about 5000 cm³/cm²·min @ 1 kPa.

Referring to FIG. 3, the battery 10 includes an integrated circuit (IC) 32. An IC may include a circuit of transistors, resistors, diodes, inductors, and capacitors constructed on a single substrate, such as a semiconductor wafer or chip, or a metal, polymer, or ceramic substrate, in which the discreet components are interconnected to perform a given function. The IC 32 may be of any suitable shape. The IC 32 may have a rectangular or square shape with a length, width, and height. The IC 32 may have a width of less than about 3 mm, preferably between about 0.5 mm and about 2 mm. The IC 32 may have a height of less than about 1.0 mm, preferably between about 0.02 mm and about 0.10 mm The IC 32 may be powered by the battery 10 (active), may be only partially powered by the battery 10 (semi-active or battery-assisted passive), or may not be powered by the battery 10 (passive), e.g., powered by an external power source. The IC may include an analog-to-digital converter and a communications circuit. The communications circuit may any suitable communications circuitry such as radio-frequency identification (RFID) circuitry and near field communication (NFC) circuitry as included within, for example, ISO/IEC 14443, 15961, 15962, 15963, and 18000 communication standards; Bluetooth circuitry as included within, for example, IEEE 802.15.1 communication standard; WiFi circuitry as included within, for example, IEEE 802.11 communication standard; Zigbee circuitry as included within, for example, IEEE 802 communication standard; and any suitable fixed wireless communication circuitry. The communications circuit may utilize any suitable frequency bands such as high frequency (HF) 13.56 MHz, ultra-high frequency (UHF) (860-956 MHz), or microwave frequency (2.4-5.8 GHz). Other communications circuitry may be used, such as audible or inaudible sound.

The IC 32 may perform any number of a series of functions with respect to the battery. The IC 32 may provide: over-discharge protection; over-charge protection; remaining capacity determination; voltage determination; cycle life determination; and power management. Power management functions may include battery identification; battery state of health; battery protection; cell balancing; fuel gauging; charge control; voltage conversion; load regulation; powering battery on/off; power setting adjustment; allow or prevent recharging; battery by-pass; temperature monitoring; and charging rate adjustment. The IC can be used, for example, in an on-cell remote indication system to provide information about the battery to, for example, a consumer. The on-cell remote indication system may include the IC; at least one resistor; at least one capacitor; and an antenna. The at least one resistor and the at least one capacitor may be integrated into the IC depending upon the desired application of the on-cell remote indication system. The on-cell remote indication may also include a magnetic diverter if the housing of the battery to which the on-cell remote indication system is attached is metal. The magnetic diverter may be, for example, a thin, ferrite material adjacent to and covering the housing. The magnetic diverter may be a film affixed to the surface of the housing 18 or incorporated within a label. The magnetic diverter may be painted or coated on the surface of the housing 18. The magnetic diverter may be, for example, about 30 micrometers to about 300 micrometers thick. The antenna may, for example, consist of several turns of a thin antenna conductor placed on top of the magnetic diverter. The antenna conductor may comprise conductive material, such as copper, aluminum, silver, gold, other conductive metals, alloys thereof, and mixtures thereof. The antenna may be made from foil. The antenna may be printed or painted. The discreet components of the on-cell remote indication system may be electrically coupled to one another. Information resulting from the functions performed by the IC, such as remaining battery capacity, may be communicated to an an external reader via the on-cell remote indication system.

The IC can be, generally, affixed to the battery 10 by an adhesive or a weld. Suitable adhesives include glues, epoxies, and any other suitable adhesive that is, for example, thermally conductive and electrically insulating. Suitable welding methods include pressure bonding, ultrasonic welding and combinations thereof or any other acceptable welding processes. The IC may be encapsulated in by a protective material, such as an epoxy. The material may protect the IC from environmental conditions and also attach the IC to the battery or label (described below).

The IC can be electrically coupled with the anode and the cathode of the battery. The IC may be in series, parallel, or a combination thereof. For example, conducting traces or a flexible circuit can connect the anode of the battery to the IC and the cathode of the battery to the IC. The conducting traces can be formed from any suitable material that is electrically conductive, such as conductive polymers, conductive glues, conductive carbon, such as graphite, and conductive metals, such as aluminum, nickel, silver, copper, gold, and tin. The conducting traces may be printed directly on the battery; may be a thin metal wire affixed to the battery; may be a thin insulated wire attached to the battery; or any other suitable form that provides electrical connection from the anode to the IC and from the cathode to the IC.

The battery 10 includes a housing 18 having a sidewall 28. Battery 10 also includes a cathode, an anode, and a separator (all not shown) within the housing 18. An electrolytic solution (not shown) is dispersed throughout the battery 10. A magnetic diverter 38 including an integrated circuit (IC) 32 is affixed the external surface of the sidewall 28 of the housing 18. The magnetic diverter 38 may be less than about 200 micrometers thick. A label 40 is affixed to the external surface of the sidewall 28 of the housing 18. The label 40 may be a laminated multi-layer film with a transparent or translucent layer bearing the label graphics and text. The label 40 may be made from polyvinyl chloride (PVC), polyethylene terephthalate (PET), and other similar polymer materials. The label 40 may include a communications circuit. The label 40 may also include an antenna and a battery characteristic measurement circuit. The communications circuit, antenna, and battery characteristic measurement circuit may alternatively be included within the IC 32. The magnetic diverter 38 can be formed of ferrite materials can be placed between the antenna and the housing 18 to inhibit interference with the antenna 32. The magnetic diverter 38 may be incorporated into the label 40. The magnetic diverter 38 can include a recess 36. The recess may be cut away from the magnetic diverter 38. The recess may alternatively be an area of the magnetic diverter that is substantially less in thickness when compared to the overall thickness of the magnetic diverter. The IC 32 can be positioned within the recess 36. A flexible circuit 42 may be in electrical communication with the IC 32. The label 40 may be affixed to the magnetic diverter 38 including the IC 32 and the flexible circuit 42. The magnetic diverter 38 including the IC 32, the flexible circuit 42, and the label 40 have a total thickness of less than about 0.5 mm, preferably from about 0.05 mm to about 0.2 mm. Discreet components, such as a resistor, capacitor, inductor, diode, transmitter, and any combination thereof, may be placed within the recess 36 in addition to the IC 32. The housing 18 of the battery 10 may also include a recess (not shown). The IC, and any additional components, included within the recess 36 of the magnetic diverter 38 extending past the surface of the magnetic diverter 38 facing the housing 18 may be placed within the recess (not shown) on the housing 18. The maximum dimensions of the battery 10 do not exceed IEC standards when the magnetic diverter 38 including the IC 32, the flexible circuit 42, and the label 40 are affixed to the battery 10.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electrochemical cell comprising: a housing having at least one open end and a sidewall; an anode, a cathode, a separator disposed between the anode and the cathode, and an electrolyte within the housing; a magnetic diverter affixed to an external surface of the sidewall of the housing, said magnetic diverter comprising a recess, and an integrated circuit positioned within the recess of the magnetic diverter, wherein the magnetic diverter is disposed between the external surface of the sidewall of the housing and the integrated circuit.

2. The electrochemical cell of claim 1 wherein the housing is cylindrical or prismatic.

3. The electrochemical cell of claim 1 wherein the integrated circuit is selected from the group consisting of a semiconductor, a silicon chip, and a printed-electronics circuit.

4. The electrochemical cell of claim 1 wherein the size of the electrochemical cell is selected from the group consisting of AAAA, AAA, AA, C, D, and 9V.

5. The electrochemical cell of claim 1 wherein the integrated circuit is powered by an external power source, powered by the electrochemical cell, or partially powered by the electrochemical cell.

6. The electrochemical cell of claim 1 wherein the integrated circuit comprises an analog-to-digital converter and a communications circuit.

7. The electrochemical cell of claim 6 wherein the communications circuit is selected from the group consisting of radio-frequency identification (RFID) circuitry, near field communication (NFC) circuitry, Bluetooth circuitry, and WiFi circuitry.

8. The electrochemical cell of claim 1 wherein the integrated circuit is in electrically coupled with the anode and cathode.

9. The electrochemical cell of claim 1 wherein a label is affixed to the magnetic diverter.

10. The electrochemical cell of claim 1 wherein the magnetic diverter is included within a label.

\* \* \* \* \*